(12) United States Patent
Wilburn et al.

(10) Patent No.: US 11,068,149 B2
(45) Date of Patent: Jul. 20, 2021

(54) INDIRECT USER INTERACTION WITH DESKTOP USING TOUCH-SENSITIVE CONTROL SURFACE

(75) Inventors: Bennett S. Wilburn, Beijing (CN); Darren K. Edge, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 419 days.

(21) Appl. No.: 12/797,555

(22) Filed: Jun. 9, 2010

(65) Prior Publication Data
US 2011/0304557 A1 Dec. 15, 2011

(51) Int. Cl.
*G06F 3/0488* (2013.01)

(52) U.S. Cl.
CPC ................. *G06F 3/0488* (2013.01)

(58) Field of Classification Search
CPC .................................................. G06F 3/0488
USPC ................. 345/2.2, 2.3, 3.3, 173; 178/18.11; 715/856, 864
See application file for complete search history.

(56) References Cited

U.S. PATENT DOCUMENTS

| | | | | |
|---|---|---|---|---|
| 4,720,703 | A * | 1/1988 | Schnarel, Jr. | G09G 5/14 345/163 |
| 5,146,049 | A * | 9/1992 | Shima | G06F 3/0488 345/157 |
| 5,483,250 | A | 1/1996 | Herrick | |
| 5,818,425 | A * | 10/1998 | Want | G06F 1/1626 345/158 |
| 5,969,698 | A | 10/1999 | Richard et al. | |
| 6,433,801 | B1 | 8/2002 | Moon et al. | |
| 6,489,934 | B1 | 12/2002 | Klausner | |
| 7,199,787 | B2 * | 4/2007 | Lee et al. | 345/169 |
| 8,279,174 | B2 * | 10/2012 | Jee et al. | 345/157 |
| 2003/0025678 | A1 * | 2/2003 | Lee et al. | 345/173 |
| 2003/0222856 | A1 * | 12/2003 | Fedorak et al. | 345/173 |
| 2003/0231168 | A1 * | 12/2003 | Bell et al. | 345/173 |
| 2004/0043799 | A1 * | 3/2004 | Ishibashi et al. | 455/575.1 |
| 2005/0195175 | A1 * | 9/2005 | Anderson | 345/204 |
| 2006/0033712 | A1 * | 2/2006 | Baudisch et al. | 345/157 |

(Continued)

FOREIGN PATENT DOCUMENTS

| | | |
|---|---|---|
| CN | 1402116 A | 3/2003 |
| CN | 1782975 A | 6/2006 |

(Continued)

OTHER PUBLICATIONS

"3M Micro Professional Projector MPro 110", retrieved on Apr. 17, 2010 at <<http://www.3m.com/intl/ca/english/centres/office/vscd/mpro>>, 3M, 2010, pp. 1.

(Continued)

*Primary Examiner* — Jeff Pizali
(74) *Attorney, Agent, or Firm* — Schwegman Lundberg & Woessner, P.A.

(57) ABSTRACT

Described herein are techniques that offer a class of user-interaction styles for indirect user interaction with a two-dimensional virtual space ("desktop") using touch-sensitive control surface of a user-input device (such as a mobile phone). Some described techniques enable a user to point, pan and scale within a large virtual two-dimensional space with input from a touch surface of a handheld device, with the output of the user interaction being rendered on a visual display unit (other than the touch surface).

15 Claims, 10 Drawing Sheets

(56) References Cited

U.S. PATENT DOCUMENTS

| | | | |
|---|---|---|---|
| 2006/0109259 A1* | 5/2006 | Ohta | 345/173 |
| 2006/0119588 A1 | 6/2006 | Yoon | |
| 2007/0236451 A1* | 10/2007 | Ofek et al. | 345/157 |
| 2008/0158170 A1* | 7/2008 | Herz et al. | 345/173 |
| 2008/0225007 A1* | 9/2008 | Nakadaira | G06F 3/03545 |
| | | | 345/173 |
| 2008/0252611 A1* | 10/2008 | Min et al. | 345/173 |
| 2008/0284730 A1 | 11/2008 | Fleck | |
| 2009/0125510 A1* | 5/2009 | Graham et al. | 707/5 |
| 2009/0128513 A1 | 5/2009 | Han et al. | |
| 2009/0231270 A1* | 9/2009 | Vartiainen et al. | 345/156 |
| 2009/0298535 A1* | 12/2009 | Klein et al. | 455/556.1 |

FOREIGN PATENT DOCUMENTS

| | | |
|---|---|---|
| CN | 101308428 A | 11/2008 |
| CN | 101441534 A | 5/2009 |
| EP | 1993026 | 11/2008 |
| EP | 2159677 | 3/2010 |
| WO | WO03065190 | 8/2003 |
| WO | 2009114009 A1 | 9/2009 |

OTHER PUBLICATIONS

Accot, et al., "More than dotting the i's—Foundations for crossing-based interfaces", retrieved on Apr. 16, 2010 at <<http://portal.acm.org/citation.cfm?id=503390>>, ACM, Proceedings of the Conference on Human Factors in Computing Systems (CHI), Minneapolis, MN, vol. 4, No. 1, Apr. 2002, pp. 73-80.

Alsos, et al., "Interaction Techniques for Using Handhelds and PCs Together in a Clinical Setting", retrieved on Apr. 16, 2010 at <<http://norwegianrockcat.com/coursework/courses/inf5621_files/clinical-paper.pdf>>, ACM, Proceedings of the 4th Nordic Conference on Human-Computer Interaction, Oslo, Norway, vol. 189, 2006, pp. 125-134.

Balakrishnan, et al., "The Role of Kinesthetic Reference Frames in Two-Handed Input Performance", retrieved on Apr. 16, 2010 at <<http://citeseerx.ist.psu.edu/viewdoc/download?doi=10.1.1.35.5039&rep=rep1&type=pdf>>, ACM, Proceedings of Symposium on User Interface Software and Technology (UIST), Asheville, North Carolina, 1999, pp. 171-178.

Bell, et al., "Dynamic Space Management for User Interfaces", retrieved on Apr. 16, 2010 at <<http://graphics.cs.columbia.edu/publications/uist00.pdf>>, ACM, Symposium on User Interface Software and Technology (UIST), San Diego, CA, Nov. 2000, pp. 238-248.

Bharath, et al., "FreePad: A Novel Handwriting-based Text Input for Pen and Touch Interfaces", retrieved on Apr. 16, 2010 at <<http://portal.acm.org/ft_gateway.cfm?id=1378814&type=pdf>>, ACM, Proceedings of the International Conference on Intelligent User Interfaces, (IUI), Canary Islands, Spain, Jan. 2008, pp. 297-300.

Blasko, et al., "Exploring Interaction with a Simulated Wrist-Worn Projection Display", retrieved on Apr. 16, 2010 at <<http://www1.cs.columbia.edu/~gblasko/Publications/Blasko_ISWC05.pdf>>, IEEE Computer Society, Proceedings of the 2005 Ninth International Symposium on Wearable Computers (ISWC), Osaka, Japan, 2005, pp. 2-9.

Capin, et al., "Camera-Based Virtual Environment Interaction on Mobile Devices", retrieved on Apr. 16, 2010 at <<http://research.nokia.com/files/Mobile-Interaction-CameraReady.pdf>>, Lecture Notes in Computer Science vol. 4263, Proceedings of the 21st International Symposium on Computer and Information Sciences (ISCIS), Oct. 2006, pp. 765-773.

Casiez, et al., "RubberEdge: Reducing Clutching by Combining Position and Rate Control with Elastic Feedback", retrieved on Apr. 16, 2010 at <<http://www.dgp.toronto.edu/~dvogel/xtra/RubberEdge/202-casiez.pdf>>, ACM, Symposium on User Interface Software and Technology (UIST), Newport, Rhode Island, Oct. 2007, pp. 129-138.

Enns, et al., "Touchpad-based Remote Control Devices", retrieved on Apr. 16, 2010 at <<http://citeseerx.ist.psu.edu/viewdoc/download?doi=10.1.1.72.2450&rep=rep1&type=pdf>>, ACM, Proceedings of Conference on Human Factors in Computing Systems (CHI), Los Angeles, CA, Apr. 1998, pp. 229-230.

Fitzmaurice, et al., "Tracking Menus", retrieved on Apr. 16, 2010 at <<http://portal.acm.org/citation.cfm?id=964704>>, ACM, Proceedings of Symposium on User Interface Software and Technology (UIST), Vancouver, Canada, vol. 5, No. 2, 2003, pp. 71-80.

Forlines, et al., "Zoom-and-Pick: Facilitating Visual Zooming and Precision Pointing with Interactive Handheld Projectors", retrieved on Apr. 16, 2010 at <<http://www.dgp.toronto.edu/~ravin/papers/uist2005_zoomandpick.pdf>>, ACM, Proceedings of Symposium on User Interface Software and Technology (UIST), Seattle, WA, Oct. 2005, pp. 73-82.

Gustafson, et al., "Wedge: Clutter-Free Visualization of Off-Screen Locations", retrieved on Apr. 16, 2010 at <<http://webcache.googleusercontent.com/search?q=cache:iYCF782bxnAJ:www.patrickbaudisch.com/publications/2008-Gustafson-CHI08-WedgeClutterFreeVisualizationOfOffScreenLocations.pdf+Wedge:+clutter-free+visualization+of+off-screen-+locations&cd=3&hl=en&ct=clnk&gl=in>>, ACM, Proceedings of the Conference on Human Factors in Computing Systems (CHI), Florence, Italy, Apr. 2008, pp. 787-796.

Harper (ed.), "Being Human: Human Computer Interaction in the Year 2020", retrieved on Apr. 16, 2010 at <<http://research.microsoft.com/en-us/um/cambridge/projects/hci2020/downloads/beinghuman_a3.pdf>> Microsoft Research, Microsoft Corporation, 2008, pp. 1-51.

Hinckley, et al., "A Survey of Design Issues in Spatial Input", retreived on Apr. 16, 2010 at <<http://www.cs.virginia.edu/papers/p213-hinckley.pdf>>, ACM, Proceedings of Symposium on User Interface Software and Technology (UIST), Marina del Rey, CA, Nov. 1994, pp. 213-222.

Kristensson, et al., "SHARK2: A Large Vocabulary Shorthand Writing System for Pen-based Computers", retrieved on Apr. 16, 2010 at <<http://pokristensson.com/pubs/KristenssonZhaiUIST2004.pdf>>, ACM, Proceedings of Symposium on User Interface Software and Technology (UIST), Santa Fe, NM, vol. 6, No. 2, Oct. 2004, pp. 43-52.

Kurtenbach, et al., "The Limits of Expert Performance Using Hierarchic Marking Menus", retrieved on Apr. 16, 2001 at <<http://citeseerx.ist.psu.edu/viewdoc/download?doi=10.1.1.92.8925&rep=rep1&type=pdf>>, IOS Press Amsterdam, Proceedings of Conference on Human Factors in Computing Systems (INTERCHI), Amsterdam, 1993, pp. 482-487.

Li, et al., "Experimental Analysis of Mode Switching Techniques in Pen-based User Interfaces", retrieved on Apr. 16, 2010 at <<http://research.microsoft.com/en-us/um/people/kenh/papers/p226-li.pdf>>, ACM, Proceedings of Conference on Human Factors in Computing Systems (CHI), Portland, Oregon, Apr. 2005, pp. 1-10.

Matejka, et al., "The Design and Evaluation of Multi-Finger Mouse Emulation Techniques", retrieved on Apr. 16, 2010 at <<http://www.dgp.toronto.edu/~tovi/papers/2009%20CHI%20SDMouse.pdf>>, ACM, Proceedings on the Conference on Human Factors in Computing Systems (CHI), Boston, MA, Apr. 2009, pp. 1073-1082.

Myers, "Using Handhelds and PCs Together", retrieved on Apr. 16, 2010 at <<http://citeseerx.ist.psu.edu/viewdoc/download;jsessionid=283E3BA751369F8CC969EAA3DD4CD9697?doi=10.1.1.24.4708&rep=rep1&type=pdf>>, Communications of the ACM, vol. 44, No. 11, Nov. 2001, pp. 34-41.

Nichols, et al., "Generating Remote Control Interfaces for Complex Appliances", retrieved on Apr. 16, 2010 at <<http://www.cs.cmu.edu/~usi/papers/PebblesPUCuist.pdf>>, ACM, Proceedings of Symposium on User Interface Software and Technology (UIST), Paris, France , 2002, pp. 161-170.

"Pointer Ballistics for Windows XP", retrieved on Apr. 16, 2010 at <<http://www.microsoft.com/whdc/archive/pointer-bal.mspx>>, Microsoft Corporation, Oct. 31, 2002, pp. 1-4.

Potter, et al., "Improving the Accuracy of Touch Screens: an Experimental Evaluation of Three Strategies", retrieved on Apr. 16, 2010 at <<http://portal.acm.org/citation.cfm?id=57167.57171>>, ACM,

(56) References Cited

OTHER PUBLICATIONS

Proceedings of Conference on Human Factors in Computing Systems (CHI), Washington, D.C., 1988, pp. 27-32.
Rohs, et al., "Map Navigation with Mobile Devices: Virtual versus Physical Movement with and without Visual Context", retrieved on Apr. 16, 2010 at <<http://www.deutsche-telekom-laboratories.de/~esslgeor/georg_papers/ICMI07-mapnav.pdf>>, ACM, Proceedings of the 9th International Conference on Multimodal Interfaces (ICMI), Nagoya, Japan, Nov. 2007, pp. 146-153.
Schoning, et al., "Map Torchlight: A Mobile Augmented Reality Camera Projector Unit", retrieved on Apr. 16, 2010 at <<http://www.deutsche-telekom-laboratories.de/~rohs/papers/Schoening-MapTorchlight-WIP-CHI09.pdf>>, ACM, Proceedings of the 27th International Conference Extended Abstracts on Human Factors in Computing Systems (CHI), Boston, MA, Apr. 2009, pp. 3841-3846.
Siek, et al., "Fat Finger Worries: How Older and Younger Users Physically Interact with PDAs", retrieved on Apr. 16, 2010 at <<http://www.cs.colorado.edu/~ksiek/INDEX_PAGE/Presentations/ksiek_Interact.ppt#256,1,Fat Finger Worries: How Older and Younger Users Physically Interact with PDAs>>, Springer Berlin, Lecture Notes in Computer Science vol. 3585, Proceedings of Interact, PPT, 2005, pp. 267-280.
Smith, "The Radial Scroll Tool: Scrolling Support for Stylus- or Touch-Based Document Navigation", retrieved on Apr. 16, 2010 at <<http://eprints.ecs.soton.ac.uk/9247/3/smith_scrhraefelUIST04radialScroll.pdf>>, ACM, Proceedings of Symposium on User Interface Software and Technology (UIST), Santa Fe, NM, Oct. 2004, pp. 53-56.
Su, et al., "Rajicon: Remote PC GUI Operations via Constricted Mobile Interfaces", retrieved on Apr. 16, 2010 at <<http://www.sigmobile.org/mobicom/2002/papers/p55-su.pdf>>, ACM, Proceedings of International Conference on Mobile Computing and Networking (MOBICOM), Atlanta, Georgia, Sep. 2002, pp. 251-262.
"Vuzix Video Eyewear", retrieved on Apr. 16, 2010 at <<http://www.vuzix.com/iwear/>>, 2010, pp. 1.
Wobbrock, et al., "Writing with a Joystick: A Comparison of Date Stamp, Selection Keyboard, and EdgeWrite", retrieved on Apr. 16, 2010 at <<http://faculty.washington.edu/wobbrock/pubs/gi-04.pdf>>, Canadian Human-Computer Communications Society, Conference on Graphics Interface, London, Canada, vol. 62, 2004, pp. 1-8.
Zhai, "Human Performance in Six Degree of Freedom Input Control", retrieved on Apr. 16, 2010 at <<http://www.almaden.ibm.com/u/zhai/papers/ZhaiPhDthesis.pdf>>, University of Toronto, Doctoral Thesis, 1995, pp. 1-179.
"First Office Action and Search Report Received for Chinese Patent Application No. 201180028193.6", dated Jan. 6, 2015, 14 Pages.
"Second Office Action Issued in Chinese Patent Application No. 201180028193.6", dated Aug. 27, 2015, 9 Pages.
The European Office Action dated Feb. 6, 2017 for European patent application No. 11792861.4, a counterpart foreign application of U.S. Appl. No. 12/797,555, 5 pages.
"Chinese Application Serial No. 201180028193.6, Argument and Amendment filed May 19, 2015 in response to First Office Action dated Jan. 6, 2015", (w/ English Translation of Argument), 8 pgs.
"Chinese Application Serial No. 201180028193.6, Argument and Amendment filed Nov. 11, 2015 in response to Second Office Action dated Aug. 27, 2015", (w/ English Translation of Argument), 8 pgs.
"European Application Serial No. 11792861.4, European Search Report dated Jan. 19, 2017", 4 pgs.
"European Application Serial No. 11792861.4, Response filed Mar. 13, 2017 to Office Action dated Feb. 6, 2017", 14 pgs.
"International Application Serial No. PCT/US2011/037424, International Search Report dated Feb. 9, 2012", 5 pgs.
"International Application Serial No. PCT/US2011/037424, International Preliminary Report on Patentability dated Dec. 20, 2012", 5 pgs.
"International Application Serial No. PCT/US2011/037424, Written Opinion dated Feb. 9, 2012", 3 pgs.
"Summon to Attend Oral Proceeding Issued in European Patent Application No. 11792861.4", dated Nov. 2017, 11 Pages.

* cited by examiner

INDIRECT USER INTERACTION WITH DESKTOP USING TOUCH-SENSITIVE CONTROL SURFACE

BACKGROUND

In this digital age, most people are familiar with two ubiquitous computing environments: stationary computing and on-the-go computing. The established stationary-computing realm involves computing systems designed primarily for heavyweight, stationary immersion by a user. Often the intensive human-computer interactions within the stationary-computing realm involve a user interacting with "window, icon, menu, and pointing device," elements. This is called a WIMP-type interaction. While it is clear that desktop computers are part of the stationary-computing realm, other nominally "portable" computing devices (such as laptops and notebooks) also fit within the context of this realm because such devices are designed to be used by a stationary user.

The second and emerging realm is called on-the-go computing (i.e., mobile computing). As its name implies, the computing devices of this realm are intended to be used primarily by a user while she is often literally "on the go." This realm is based upon highly portable devices (e.g., mobile or smart phones) that often provide functionality beyond just computing. Contrary to the stationary-computing realm, the on-the-go-computing realm offers a lightweight mobile engagement for its users.

While some of the applications available in the stationary-computing realm are also available within the on-the-go-computing realm, the on-the-go user does not have a true ability to fully engage in the heavy-duty stationary immersion available in the stationary-computing realm. Naturally, a portable on-the-go-computing device has a much smaller screen size than that of a typical stationary-computing device. For this reason alone, the on-the-go user is unable to experience the serious in-depth interaction available to the user in the stationary-computing realm.

SUMMARY

Described herein are techniques that offer a class of user-interaction styles for indirect user interaction with a two-dimensional virtual space ("desktop") using touch-sensitive control surface of a user-input device (such as a mobile phone). Some described techniques enable a user to point, pan and scale within a large, virtual, two-dimensional space with input from the touch surface of a handheld device, with the output of the user interaction being rendered on a visual display unit (other than the touch surface).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
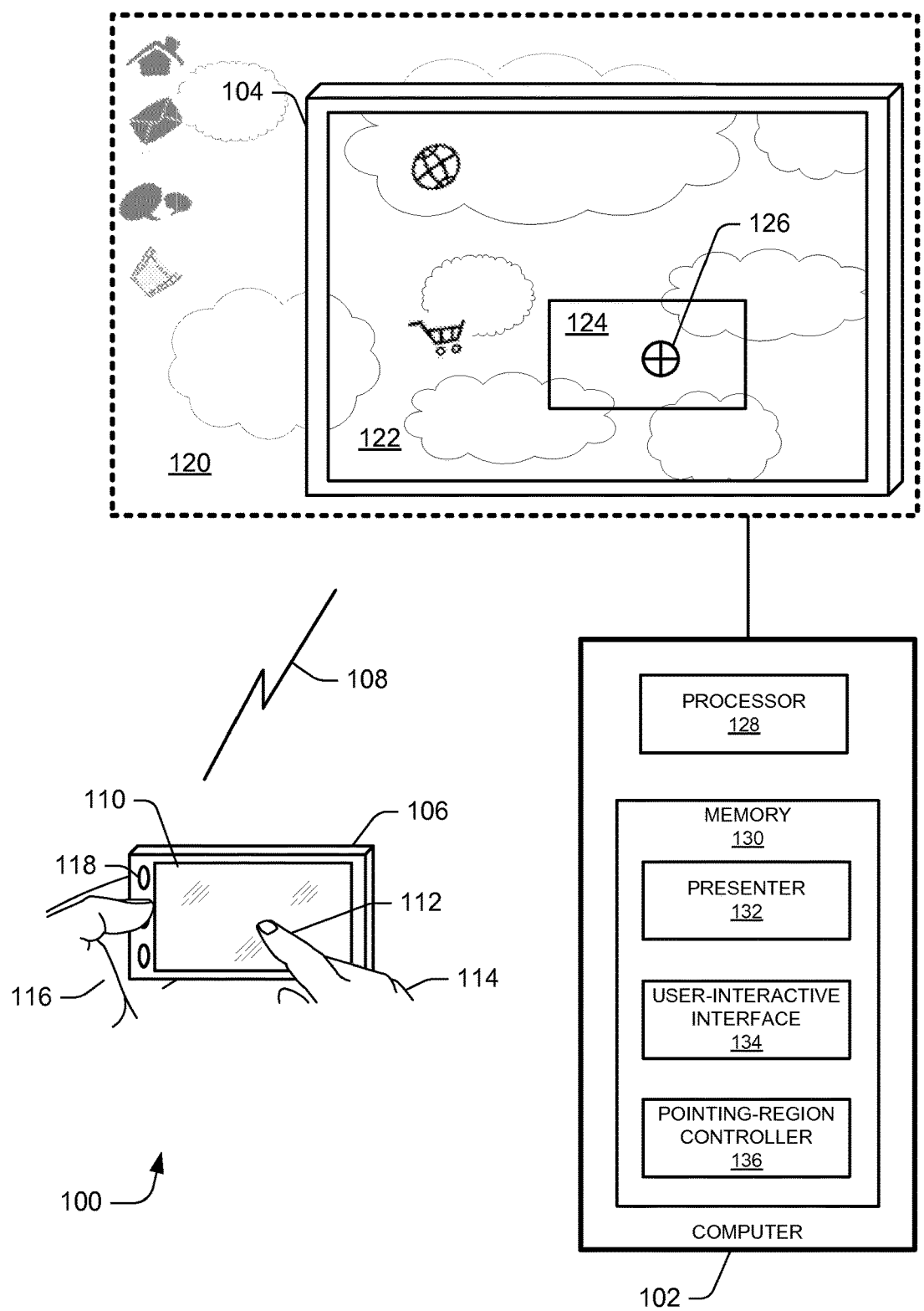
FIG. 1 illustrates an exemplary computing environment that implements techniques for one or more indirect user-interaction styles described herein.

Described herein are techniques that enable a user of a portable device of the on-the-go-computing realm to immerse herself into the heavyweight, stationary-computing realm. Described herein are techniques for indirect user interaction with a two-dimensional virtual space ("desktop") of a presentation device using a touch-sensitive control surface of a user-input device (such as a mobile phone). The techniques described herein introduce a class of user-interaction styles that enables a user to move, point, pan, zoom, and scale within a large virtual two-dimensional space with input from the touch surface of a handheld device, with the output of the user interaction being rendered on an external visual display unit. The described techniques have the advantages of the greater visual real estate (e.g., a physically larger and more visually comfortable display, and/or higher pixel resolution) of large external visual display units along with the convenience of portable, mobile computing devices. With one or more implementations of the techniques described herein, the small touchscreen of a mobile phone, for example, functions like a mouse and/or keyboard for user interaction with a computing system. Other touchscreen scenarios exist, for example, with smart phones. However, with those scenarios, the touchscreen is sufficient to fully access the displayed area and the user interaction between the touchscreen and the output display is direct. With these other existing touchscreen-input scenarios, the touchscreen is coextensive with the display area. There is nothing being displayed that the user cannot access by touching the touchscreen. Furthermore, since the user is actually touching the coextensive touchscreen, she can see where she is touching. The user interaction in that case is direct. For example, if the user wishes to activate a program, the user simply touches the icon for the program. The user knows that she is touching the program's icon because she can see a direct touch of the screen right over where the icon is displayed on the display area.

In contrast with the existing approach, the new user-interaction styles involve a touchscreen that is smaller than the displayed area and, because the touchscreen is not part of the display area, the user interaction is indirect. More particularly, the input device (e.g., a mobile phone) is separate from the display area. Because of this, the touchscreen is not coextensive with the display area. That is, there is not a one-to-one correspondence between the area of the input touchscreen and the output display area.

As described herein, the one or more of the new user-interaction styles address resolution mismatches. Such mismatches may exist between the touchscreen of the mobile phone and a visual display unit or the touchscreen and a larger two-dimensional virtual space (i.e., "desktop") of a presentation device (e.g., wall-mounted display). Also, the new user-interaction styles address how the user interacts with the desktop indirectly by using the touchscreen of the phone. More particularly, indirect interaction is accomplished using eyes-free handling of the mobile phone.

This brief introduction, including section titles and corresponding summaries, is provided for the reader's convenience and is not intended to limit the scope of the claims, nor the proceeding sections.

Exemplary Computing Environment

FIG. 1 illustrates an exemplary computing environment 100 that may implement the described techniques for indirect user interaction with a two-dimensional virtual space of the stationary-computing realm using the touch-sensitive control surface of a portable user-input device of the on-the-go computer realm. The example user interaction may also be called "heads-up, hands-down." The environment 100 may include at least one computing device 102 having a visual display unit 104 and a user-input device 106 that is communicatively coupled 108 with the computing device 102.

The computing device 102 may be one that is typically used in the stationary-computing realm. The computing device 102 may be any suitable computing device that is capable of producing a virtual two-dimensional space designed primarily for user interaction with a typically stationary user. The virtual two-dimensional space is called a "desktop" herein. Often the desktop allows for WIMP-type interactions. WIMP typically denotes a style of interaction using window, icon, menu, and pointing devices. While not necessarily fully illustrated, the computing device 102 has processors, memories, storage subsystems, and input/output subsystems, such as a keyboard, mouse, monitor, speakers, etc.

The visual display unit 104 is depicted in FIG. 1 as a flat-panel monitor. For this or other implementations, the visual display unit 104 may be any suitable visual-output display device that is typically used to display a desktop designed primarily for user interaction with a stationary user. Other examples of suitable visual display units include (by way of example and not limitation): any flat-panel display, such as plasma, liquid crystal display (LCD) or organic light emitting diode (OLED); cathode ray tube (CRT) display; large wall-mounted monitor; projector; portable pico-projector (i.e., handheld or pocket projector); human wearable display (HWD), such as a head-mounted display (HMD); heads-up display (e.g., cock-pit display); electronic paper; virtual retinal display; stadium/arena mega-display or scoreboard; and television.

Since the computing device 102 and the visual display unit 104 work together to present or render the desktop in an interactive manner to a user, they are collectively referred to a "presentation device" or "rendering device" herein and in the context of the exemplary computing environment 100.

The user-input device 106 is shown in FIG. 1 as a mobile phone and hereinafter may be referred to as such. The mobile phone 106 has a touch-sensitive control surface 110, which is commonly called a touchscreen and hereinafter may be referred to as such. The touchscreen 110 of the mobile phone 106 is separate from the visual display unit 104. More precisely, the touchscreen 110 and the visual display unit 104 are not coextensive with each other. That is, the touchscreen 110 and the visual display unit 104 do not share the same surface.

A mobile phone 106 may also be called a cell phone, smart phone, wireless handset, a handphone, satellite phone, wireless phone, or the like. For this or other implementations, the user-input device 106 may be any suitable handheld computing device having a touchscreen 110 or a specialized surface that detects the motion and position of one or more fingers or styluses on that surface. Other examples of suitable user-input devices include (by way of example and not limitation): touchpad, personal digital assistant (PDA), tablet, watch, navigational system, digital audio player, and digital multimedia player. Some tablet-based computer systems have a "hover state" that, for example, detects a stylus before it contacts the surface of the tablet. In this scenario, the user can position the stylus accurately before touching the tablet's screen. For many of the implementations discussed herein, the user-input device 106 does not have a pointing hover state. However, other implementations may employ a user-input device 106 with a pointing hover state.

As shown in FIG. 1, the communicative coupling 108 between the user-input device 106 and the presentation device is wireless. In this implementation, the wireless communicative coupling 108 is any suitable short-distance wireless communication approach, such as that offered by BLUETOOTH™, near field communication (NFC), and wireless personal area network (WPAN) standards. Alternatively, the wireless connection may be via a longer-range wireless communication approach, such as that offered by wireless local area network (WLAN) standards or cellular networks. Furthermore, the communicative coupling 108 may be a wired connection, such as that offered by a universal serial bus (USB) cable or Ethernet cable.

FIG. 1 shows the mobile phone 106 being held by a human user. She is touching the touchscreen 110 with her finger 112 of her right hand 114 while holding the mobile phone 106 in her left hand 116. The mobile phone 106 has at least one mode-changing button 118. The mode-changing button 118 is shown here under the user's thumb, but the user isn't necessarily pressing the button in this depiction. As depicted here, the user is actually touching the touchscreen 110 with her finger 112. Of course, other suitable input alternatives may be used in other implementations. Suitable alternatives include (by way of example and not limitation): defined motions of a stylus or touch; a simulated button on-screen, multi-touch interactions; accelerometers in a mobile phone; and accelerometers in a HWD device. In the later example with the HWD device, a user's body motion may be used to directly control panning and zooming of a viewing area. When the user is wearing an eyewear display, head motions may provide a very natural interface that corresponds to human behavior in front of large displays. For example, panning may result from the user turning her head to look at different portions of the screen and zooming may result from when she leans closer to see more detail or away to see less detail.

Within the touchscreen 110 is a control region. Since the control region is coextensive with the touchscreen 110, it is not depicted separately from the touchscreen 110 in FIG. 1. Generally, the control region may be smaller than or equal in size to the touchscreen 110. For the sake of simplicity, because the control region is coextensive to the touchscreen 110, the control region is not explicitly discussed within the context of this particular implementation.

As illustrated, the presentation device produces a desktop 120 for the purpose of interacting with the user, especially WIMP-type interaction. The desktop 120 may be any arbitrarily large, two-dimensional virtual space intended for interaction with a user, such as a gaming environment. The presentation device has a displayed viewport 122 that shows only the viewable or displayed portion of the desktop 120.

Most computer users are familiar with scenarios where the displayed viewport 122 exactly matches the desktop 120. However, in some instances only a portion of the desktop 120 is viewable by the presentation device. An example of such a situation is with the use of HWD devices, such as portable eyewear displays. It is common for a HWD to have a resolution which is much less than that of the desktop 120. In those instances, the HWD only displays a portion of the desktop 120 at any one time. The discussion herein of this and other implementations presumes that the viewport 122 displays only a portion (e.g., half or a third) of the entire desktop 120. In other words, the resolution of the viewport 122 is less than the resolution of the desktop 120. With other alternative implementations, their resolutions may match; thus the viewport 122 may display all of the desktop 120.

FIG. 1 shows a pointing region 124 within the viewport 122. The discussion herein of this and some of the other implementations presumes that the pointing region 124 is smaller than and included within the viewport 122. In other words, the resolution of the pointing region 124 is less than the resolution of viewport 122. With other alternative implementations, the resolutions of the pointing region 124 may match the viewport 122.

As shown, the pointing region 124 corresponds dimensionally to the touchscreen 110 of the mobile phone 106. The correspondence is one-to-one (1:1) so that the resolution of the touchscreen 110 matches the effective resolution of the pointing region 124. The effective resolution may depend upon of the pixel resolution of the screen of the touchscreen and the visual display unit. The effective resolution may also depend upon human factors. For example, the effective resolution of a presentation screen may be less than its physical resolution if the viewer is far away. For touch devices, the size of the user's finger may make the effective touch resolution much smaller than the touch screen's pixel resolution.

The term "resolution" is a shortened form of "display resolution" or "screen resolution." To disambiguate from other known forms of resolution, the term "spatial extent" is used to describe the intended type of "display resolution" or "screen resolution" addressed herein. As used herein, spatial extent of a box, area, region, etc. refers to its pixel dimensions in terms of width and height. For example, the desktop 120 may have a spatial extent of 1920×1080, the viewport 122 may have a spatial extent of 1024×768, and the pointing region 124 may have a spatial extent of 320×240.

In this example, the spatial extent of the touchscreen 110 would be 320×240 because its spatial extent matches the spatial extent of the pointing region 124. In general, the control region has a spatial extent that matches the spatial extent of the pointing region 124. So, for other implementations where the control region is smaller than the touchscreen 110, the spatial extent of the control region would match that of the pointing region 124, but the touchscreen would have a greater spatial extent.

FIG. 1 shows, within the pointing region 124, a mousing ring 126 depicted as a circle with cross-hairs. This mousing ring 126 may also be called a cursor, a pointer, or simply a ring. Of course, in other implementations, the ring 126 may take on a different shape, like an arrow or a hand. The ring 126 indicates where the user is currently pointing and may be used to initiate user input, which is sometimes called a "mouse event." Examples of mouse events include a mouse click, drag, double-click, right-click, etc.

In some implementations, when the user lifts her finger 112, the ring 126 changes color and becomes dashed. This indicates that the user has an opportunity to generate a mouse event. However, in other implementations other color schemes and visual indications may be used (e.g., texture, line weight, etc.). If the finger 112 touches the touchscreen 110 outside a typically unseen touch zone on the touchscreen 110, the ring 126 disappears. In this implementation, the touch zone is a space surrounding where the user is touching on the touchscreen 110. The touch zone is typically a fifteen pixel radius centered on where the user touches. However, in other implementations different size zones may be used. Alternatively, the user's finger 112 remaining off of the touchscreen 110 for at least a defined time (e.g., one second) may also cause the ring 126 to disappear.

If the user touches inside the touch zone within the defined time (e.g., one second), the ring 126 changes color to indicate that the mouse event will occur at the ring's position within the pointing region 124. If at this point the user lifts her finger 112, a single-click mouse event is triggered. This causes the ring 126 to change color again and resets a ring timer to support double clicks. If instead the user drags her finger 112 outside the touch zone, a mouse drag action is triggered. After a single click, if the finger 112 again contacts the touchscreen 110 inside the touch zone and is released, the ring 126 changes color one more time, and a double-click mouse event is triggered.

The touchscreen 110 of the mobile phone 106 is mapped absolutely to the pointing region 124 within the viewport 122, which is within the desktop 120. Herein, absolute mapping means that each pixel of input spatial extent of the touchscreen 110 maps directly to the same corresponding pixel of output spatial extent of the pointing region 124. So, as shown in FIG. 1, the ring 126 appears or moves to a point in the pointing region 124 that corresponds to the absolutely mapped point that the user's finger 112 is touching on the touchscreen 110.

Unlike with a traditional input from a mouse or a pen-input tablet, touchscreens of mobile phones are small, low-resolution, and need to be stabilized (typically by a user holding the mobile phone 106 in the non-dominant hand 116). Because of this, the user might have a tendency to draw off the edge of the touchscreen 110 when not looking at the mobile phone 106 while interacting in a large virtual space. This drawing-off-the-edge tendency is ameliorated by the absolute mapping of the pointing region 124 to the touchscreen 110 and visual feedback of the touch location within the pointing region 124 offered by the ring 126.

One operation principle of this and other implementations described herein is that once the user has established contact between the screen and their finger 112 or stylus, the user should be able to perform bursts of mouse-like interactions without the disruption of "clutching." This principle is called the "sticky eyes-free" design. Clutching is a common action performed by a user with traditional relative pointing interactions, such as a mouse. Clutching is when the pointing device is repositioned before it runs out of input space, but before the associated pointer has reached the edge of the pointable area. For example, a mouse may reach the edge of the mouse pad long before the pointer has reached the edge of the screen or window.

However, as it is described to this point, the user is only able to access the portion of the desktop 120 presently encircled by the pointing region 124 in its present position. Because of the absolute mapping between the pointing region 124 and the touchscreen 110, the user cannot move outside the pointing region 124 without something more. The user can switch to a pan-zoom mode with additional or different input provided by, for example, the user pressing the pan-zoom mode button 118 on the mobile phone 106. In other implementations, this may just be a pan mode button or a zoom mode button. In this description, pressing of the pan-zoom mode button 118 is called the button-down mode. Instead of button 118, the user may utilize a prolonged selection of some area, such as the edge of the viewport, to select and move the viewport.

In button-down mode, the movement of the finger 112 on the touchscreen 110 directs the pointing region 124 to move relatively within the viewport 122. The relative movement is based, at least in part, upon the persistence of the box or boundary defining the edges of the pointing region 124. So, a button-press with a touching movement to the right causes the pointing region 124 to move to the right in a similar manner. Once the pointing region 124 moves past the edges of the viewport 122, then both the pointing region 124 and the viewport 122 move relatively within the desktop 120.

Note that, unlike the absolute movement of the ring 126 inside the pointing region 124, the movement of the pointing region 124 itself is relative. A button-down touchscreen direction causes a movement of the pointing region 124 relative from its original position in the viewport 122 before the direction to move.

The presentation device includes at least one processor 128 and a memory 130. In that memory are at least three components: a presenter 132, a user-interactive interface 134, and a pointing-region controller 136.

The presenter 132 manages the display of the three nested spaces: the desktop 120, the viewport 122, and the pointing region 124. These nested spaces correspond to three nested levels of user interaction. The desktop 120 is the two-dimensional virtual space, the viewport 122 defines what the user can see within that virtual space, and the pointing region 124 defines what the user can select within what the user can see.

The presenter 132 manages what portion of the desktop 120 is displayed via the viewport 122. The presenter 132 also manages the panning and scaling (i.e., zooming in or out) of the viewport's view of the desktop 120. In addition, the presenter 132 handles the display of the pointing region 124 in the viewport 122. The presenter 132 also handles the display of and movement of the ring 126 inside the pointing region 124.

The user-interaction interface 134 handles the communication with the mobile phone 106. More particularly, the interface 134 gets and interprets the input from the mobile phone 106. For example, the interface 134 obtains input from the user touching within the control region of the touchscreen 110 of the mobile phone 106. The interface 134 also handles other input from the mobile phone 106 or other devices that may affect the user interaction. For example, other input may come from pressing of buttons (such as mode-changing button 118), an accelerometer in the mobile phone 106, or buttons or an accelerometer of other devices (such as a HWD device).

The pointing-region controller 136 maps, in an absolute fashion, the control region of the touch-sensitive control surface 110 of the user-input device 106 to the pointing region 124. The pointing-region controller 136 maps each point (i.e., pixel) of the control region of the touch-sensitive control surface 110 with each point (i.e., pixel) of the pointing region 124. With this absolute mapping, the ring 126 moves within the pointing region 124 in a manner that corresponds absolutely to how the user moves their finger 112 inside the control region (which is the same as the touch-sensitive control surface 110 for this particular implementation).

In this implementation, the components are software modules of computer-executable instructions residing in the memory 130 and are being executed, as needed, by a processor 128. In general, the computer-executable instructions are instructions executable on one or more computers, a computing device, or the processors of a computer. While shown here as modules, the components may be embodied as hardware, firmware, software, or any combination thereof. Also, while shown here residing on a single computing device (i.e., the computing device 102), the components may be distributed across many computing devices in the distributed system or network.

In some alternative embodiments, the mobile phone 106 may be part of the presentation device. For example, the mobile phone 106 may provide some or all of the computing power for one or more of the components. Indeed, the mobile phone 106 may provide some or all of the components. If so, the mobile phone 106 is not providing the functionality of the visual display unit 104 through the touchscreen 110. In other words, the viewport 122 and pointing region 124 are not seen through the touchscreen 110 of the mobile phone 106. In some implementations, the mobile phone 106 may offer a visual display unit that is separate from the touchscreen 110 being used for user interaction.

Jabber User-Interaction Style

Figure 2:
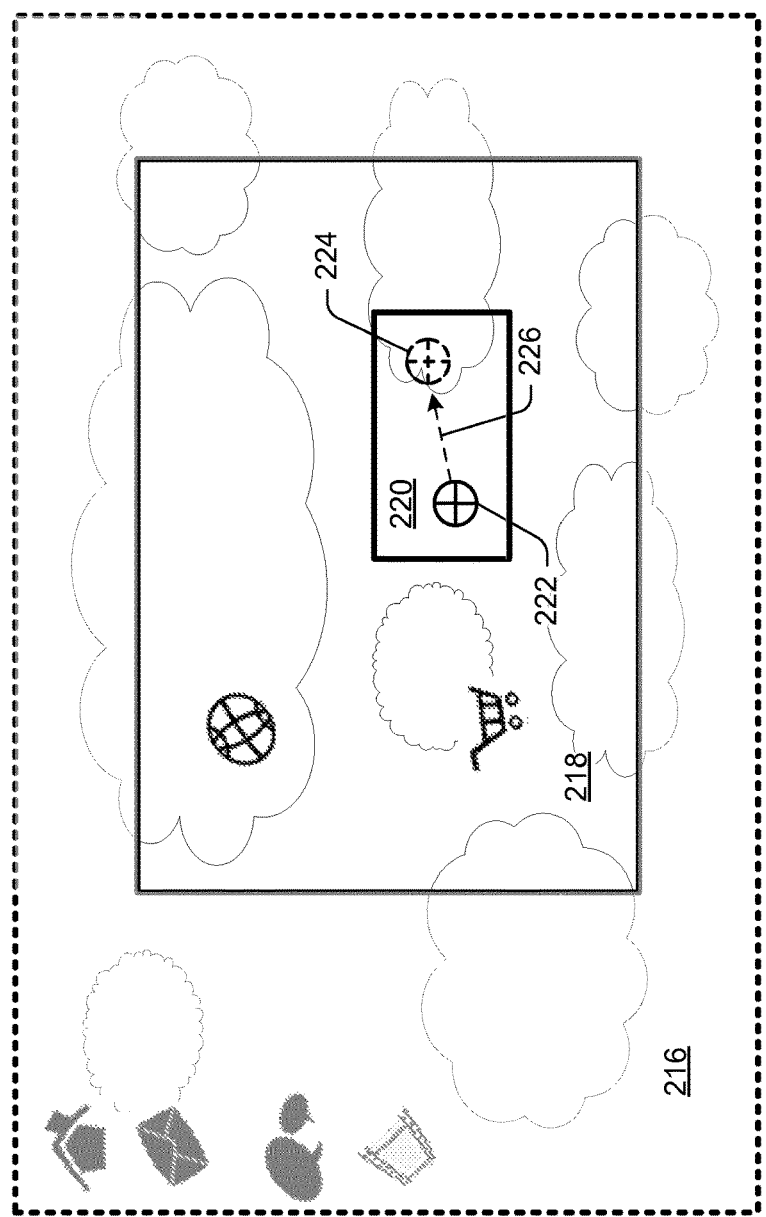
FIGS. 2-4 are illustrations of at least exemplary one user-interaction style (called "Jabber") in accordance with one or more implementations of the techniques described herein.
Figure 2:
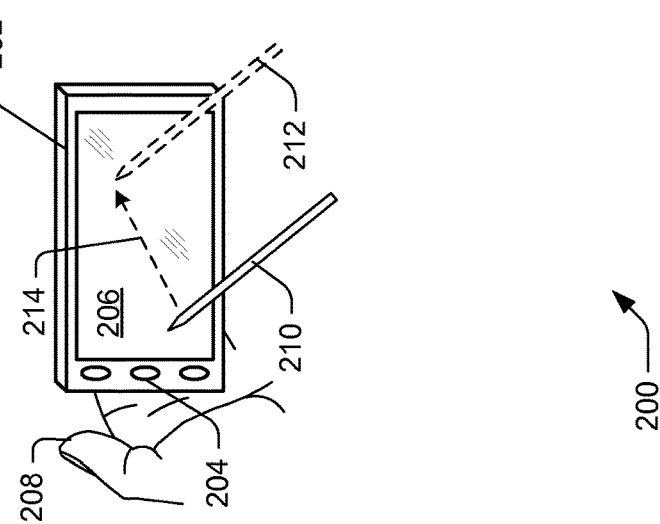
Figure 3:
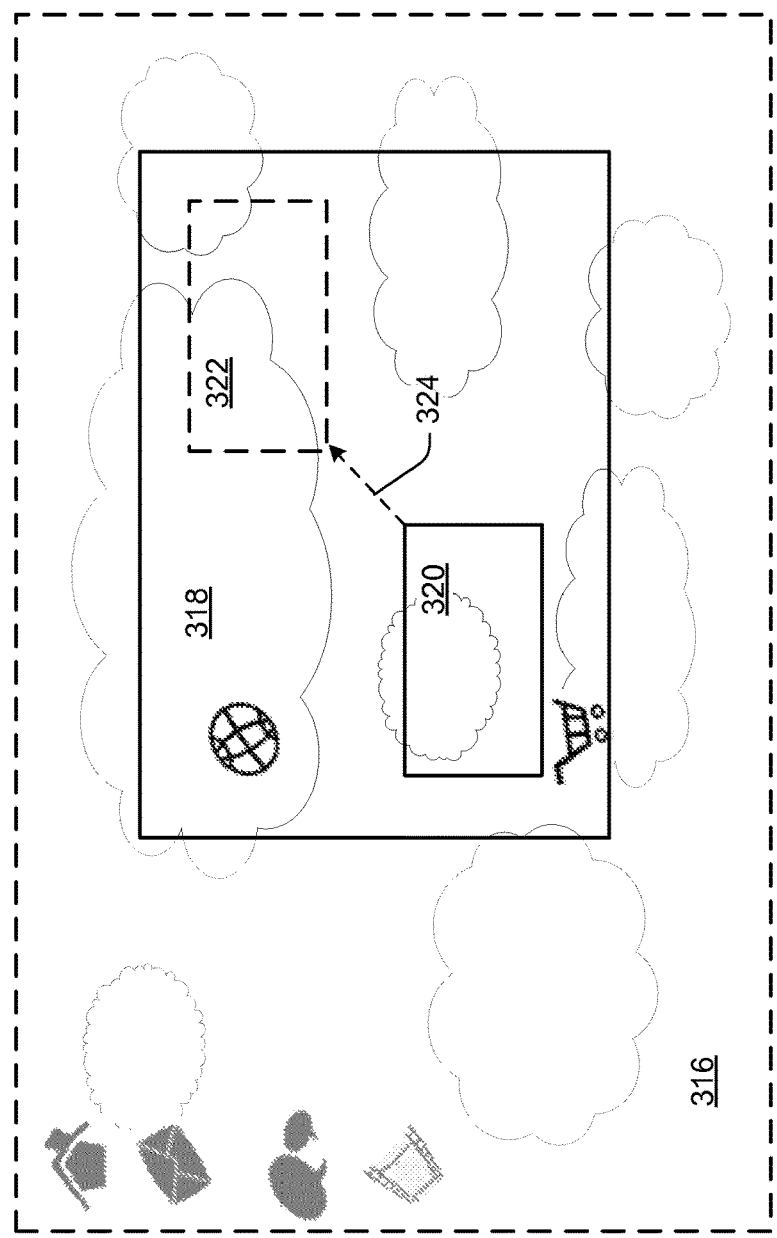
Figure 3:
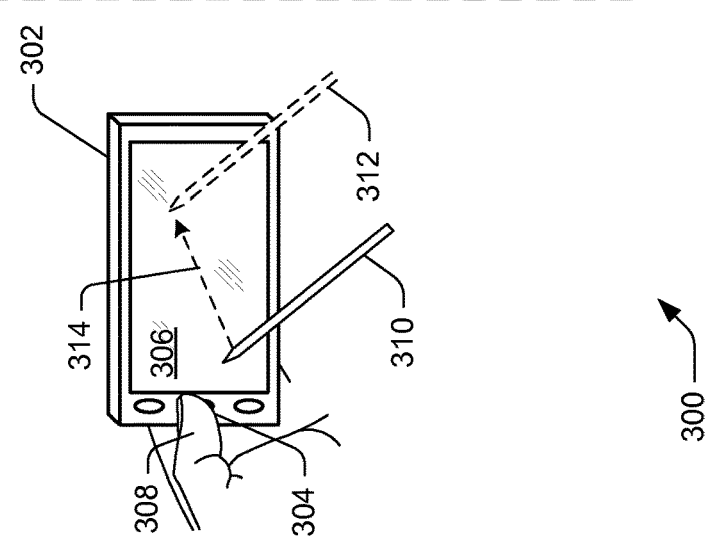
Figure 4:
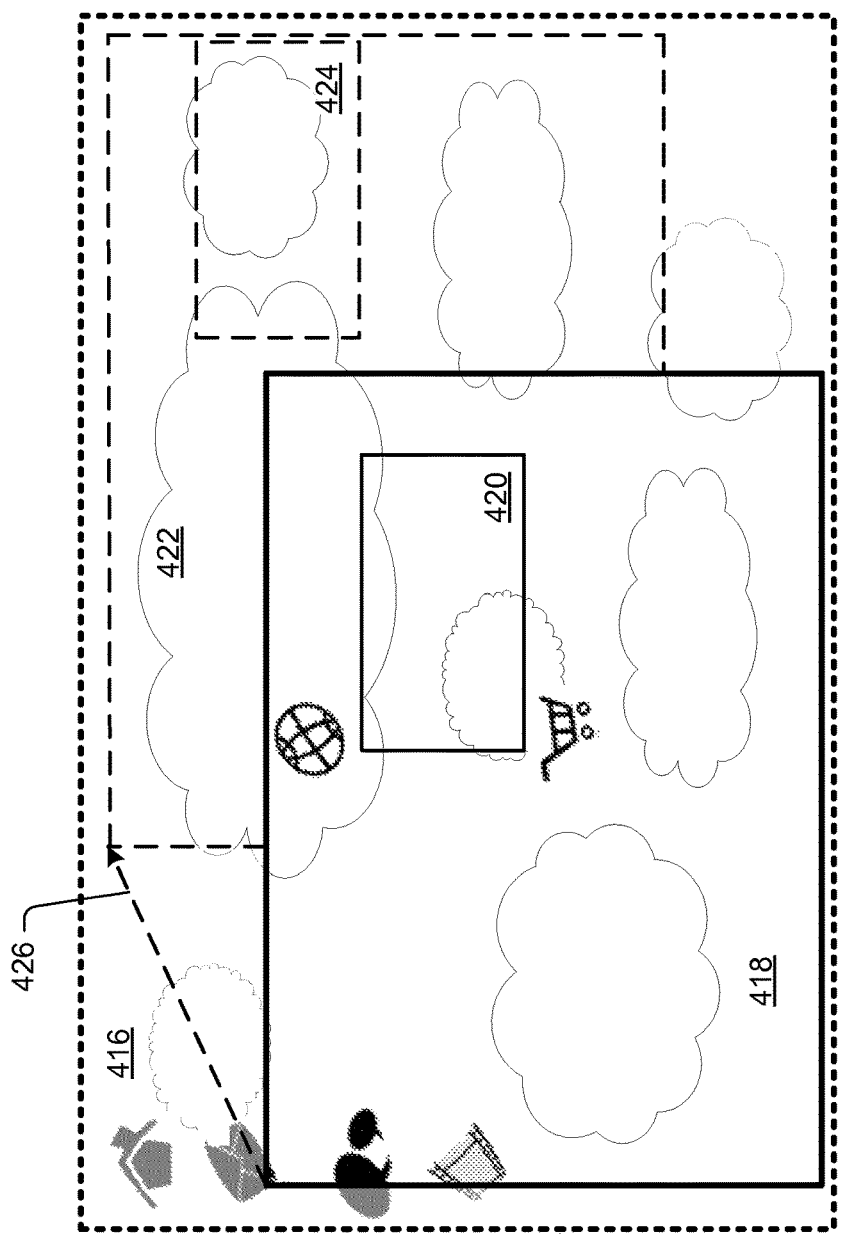
Figure 4:
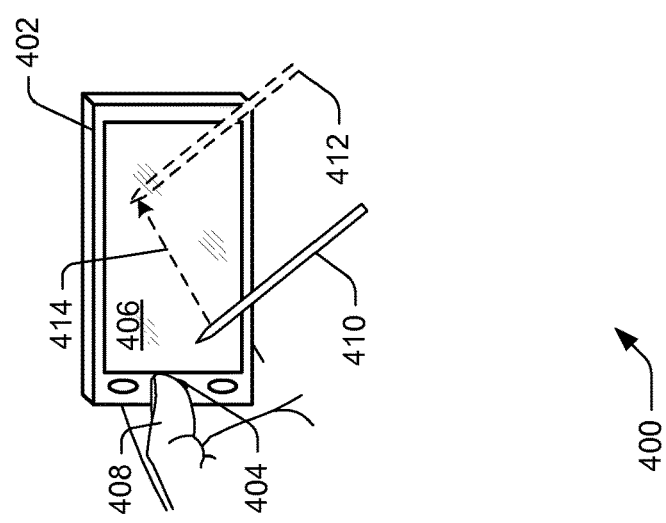

FIGS. 2-4 illustrate aspects of at least one implementation (called "Jabber") of the described techniques for indirect user interaction with the desktop of a presentation device using a touch-sensitive control surface of the user-input device. Generally speaking, the Jabber user-interaction style utilizes an absolute pointing arrangement for moving a pointer within a pointing region embedded within a relative arrangement for moving a pointing region. Part of the Jabber user-interaction style is shown in FIG. 1. FIGS. 2-4 continue the depiction of the Jabber user-interaction style.

FIG. 2 shows an exemplary arrangement 200 for the Jabber user-interaction style. This arrangement includes mobile phone 202 with a pan-zoom mode button 204 and a touchscreen 206. As shown, the user's thumb 208 is not pressing the button 204. Instead of using her finger, the user is using a stylus 210 so that it is touching the lower left-hand corner of the touchscreen 206. A dashed-line stylus 212 and dashed-line arrow 214 indicate that the user moved the stylus 210 from the lower left-hand corner to the upper right-hand corner of the touchscreen 206.

FIG. 2 also shows three nested spaces that are navigated by the user touching the touchscreen 206 of the phone mobile 202. From largest to smallest spaces, the spaces include a desktop 216, displayed viewport 218, and the pointing region 220.

A mousing ring 222 is located inside the pointing region 220 in a position that corresponds with the position of the stylus 210 in the touchscreen 206. A dashed-line mousing ring 224 and its dashed-line arrow 226 indicate the movement of the mouse ring 222 that corresponds with the movement of the stylus 210. The stylus 210 moves from the lower left-hand corner to the upper right-hand corner of the touchscreen 206 and directs the ring 222 to move in a similar manner inside the pointing region 220.

This demonstrates the absolute relationship between movement of the stylus 210 touching the touchscreen 206 and the movement of ring 222 in the pointing region 220. For this embodiment, the control region matches the touchscreen 206 completely. In other embodiments, the control region may be smaller in size than and/or different in shape from the touchscreen 206. In those embodiments, the absolute relationship is between a touch within the control region of the touchscreen 206 and the similarly-shaped and sized-pointing region 220.

FIG. 3 shows another exemplary Jabber user-interaction arrangement 300, which is arranged very similarly to the exemplary arrangement 200. The user-interaction arrangement 300 includes mobile phone 302 with a pan-zoom mode button 304 and a touchscreen 306. Unlike the exemplary arrangement 200, the user's thumb 308 is pressing the pan-zoom mode button 304 in the user-interaction arrangement 300. A stylus 310 is touching the lower left-hand corner of the touchscreen 306. A dashed-line stylus 312 and dashed-line arrow 314 indicate that the user moved the stylus 310 from the lower left-hand corner to the upper right-hand corner of the touchscreen 306.

FIG. 3 also shows three nested spaces that are navigated by the user touching the touchscreen 306 of the mobile phone 302. From largest to smallest spaces, the spaces include a desktop 316, displayed viewport 318, and the pointing region 320.

Unlike the exemplary arrangement 200, the user-interaction arrangement 300 shows no mousing ring, (e.g. 126, 222). By pressing the pan-zoom mode button 304, the user has entered the pan-zoom interaction mode. In this mode, the mousing ring is not utilized. Therefore, the ring may disappear. When in the pan-zoom interaction mode, movement on the touchscreen 306 directs panning of the pointing region 320 within the viewport 318 or the zooming of the displayed viewport 318 within the desktop 316.

To pan the pointing region 320 around the displayed viewport 318, the user presses the pan-zoom mode button 304 without pointing at a target. Unlike the absolute mapping and movement of the mousing ring inside the pointing region (e.g. 124, 220), the stylus strokes move the pointing region 320 in a relative fashion when panning. That is, pointing region moves relative to previous persistent position in the viewport.

The solid-line pointing region 320 indicates a starting position at the time that the user placed the stylus 310 on the touchscreen 306. A dashed-line pointing region 322 and dashed-line arrow 324 indicate the panning movement of the pointing region that corresponds with the movement of the stylus 310. The stylus 310 moves up and to the right on the touchscreen 306 and directs the pointing region 320 to move in a similar manner relative to the movement of the stylus 310. Since the pointing region 320 stays within the bounds of the displayed viewport 318, the displayed viewport 318 is unmoved by the movement of the pointing region 320.

FIG. 4 shows still another exemplary Jabber arrangement 400, which is arranged similarly to the user-interaction arrangement 300. The exemplary Jabber arrangement 400 includes mobile phone 402 with a pan-zoom mode button 404 and a touchscreen 406. Like the arrangement 300, the user's thumb 408 is pressing the pan-zoom mode button 404 in the exemplary Jabber arrangement 400. A stylus 410 is touching the lower left-hand corner of the touchscreen 406. A dashed-line stylus 412 and its dashed-line arrow 414 indicate that the user moved the stylus from the lower half to the upper half of the touchscreen 406. FIG. 4 also shows three nested spaces: a desktop 416, a solid-line viewport 418, and a solid-line pointing region 420.

Like the user-interaction arrangement 300, the exemplary Jabber arrangement 400 shows the pan-zoom interaction mode. The solid-line viewport 418 and solid-line pointing region 420 indicate a starting position at the time that the user placed the stylus 410 on the touchscreen 406. A dashed-line viewport 422 and a dashed-line pointing region 424 (with dashed-line arrow 426) indicate the panning movement of both the viewport and the pointing region that corresponds with the movement of the stylus 410. The stylus 410 moves up on the touchscreen 406 and directs the solid-line pointing region 420 to move in a similar manner relative to the movement of the stylus 410. Since the movement of the solid-line pointing region 420 extends beyond the bounds of the solid-line viewport 418, the viewport moves as well as the pointing region.

Panning beyond the desktop 416 may be allowed to address particular situations. For example, when a user is wearing a head-mounted display, the fixed-head display relationship makes it physiologically difficult and/or uncomfortable for the user to look at the corners of the display. Also, in some head-mounted displays, the corners themselves can be visually distorted as an artifact of the display technology. Consequently, a pan beyond the desktop 416 may be allowed, so that the corner of the desktop 416 can be centered into the users' view.

As the name implies, pressing the pan-zoom mode button (such as button 404) allows the user to zoom as well as pan. When zooming, the extent of the real estate that the viewport 422 takes up of the desktop 416 changes. It will appear that the user is zooming in or zooming out of the desktop 416. When zooming, the spatial extent of the desktop changes as well. The viewport 422 zooms in to or out of the desktop 416 when the user points at a target while pressing the pan-zoom mode button 404. If, when zooming, the user zooms into the pointing region 424, the pointing box is temporarily shrunk to fit in the viewport 422. The zooming aspect is discussed further with regard to the "Grabber" user-interaction style shown in FIGS. 8-9.

Also, with the Jabber user-interface style, once a drag has been initiated, holding down the pan-zoom button 404 allows the drag to persist over one or more pan operations. The pointer position within the pointing box follows the stylus position to ensure smooth transitions in and out of panning. This makes the entire desktop 416 easily accessible within a single drag and greatly improves the use of draggable controls such as scroll bars.

Joystick User-Interaction Style

Figure 5:
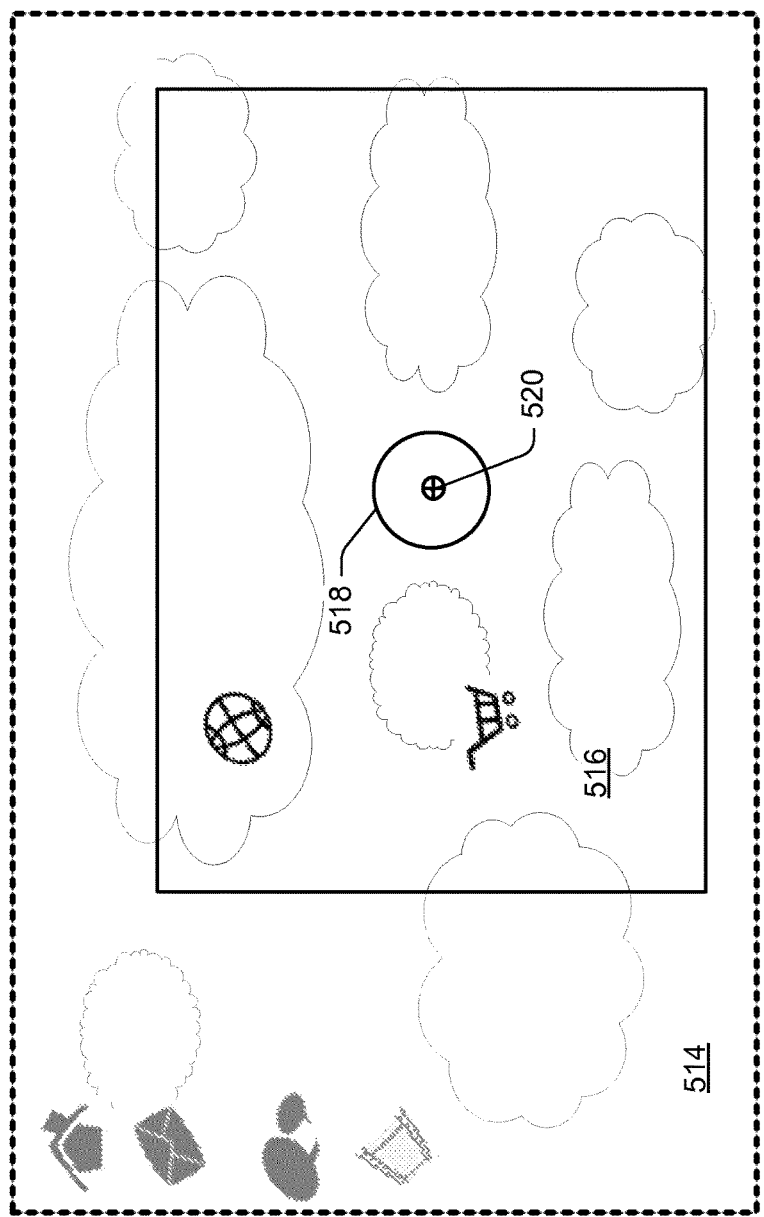
FIGS. 5-7 are exemplary illustrations of another exemplary user-interaction style (called "Joystick") in accordance with one or more implementations of the techniques described herein.
Figure 5:
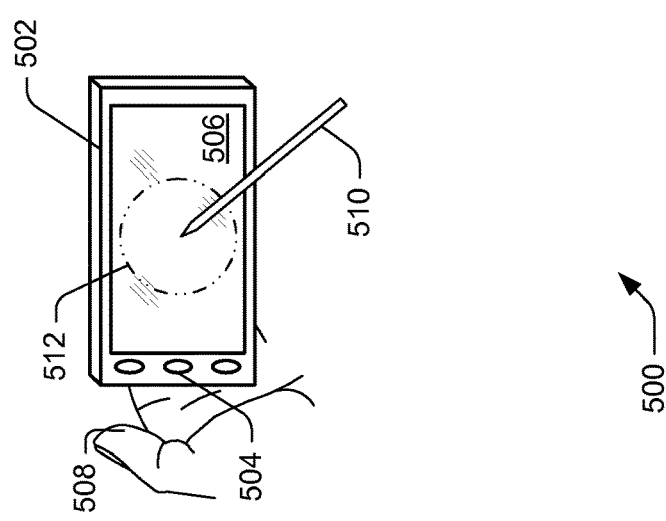
Figure 6:
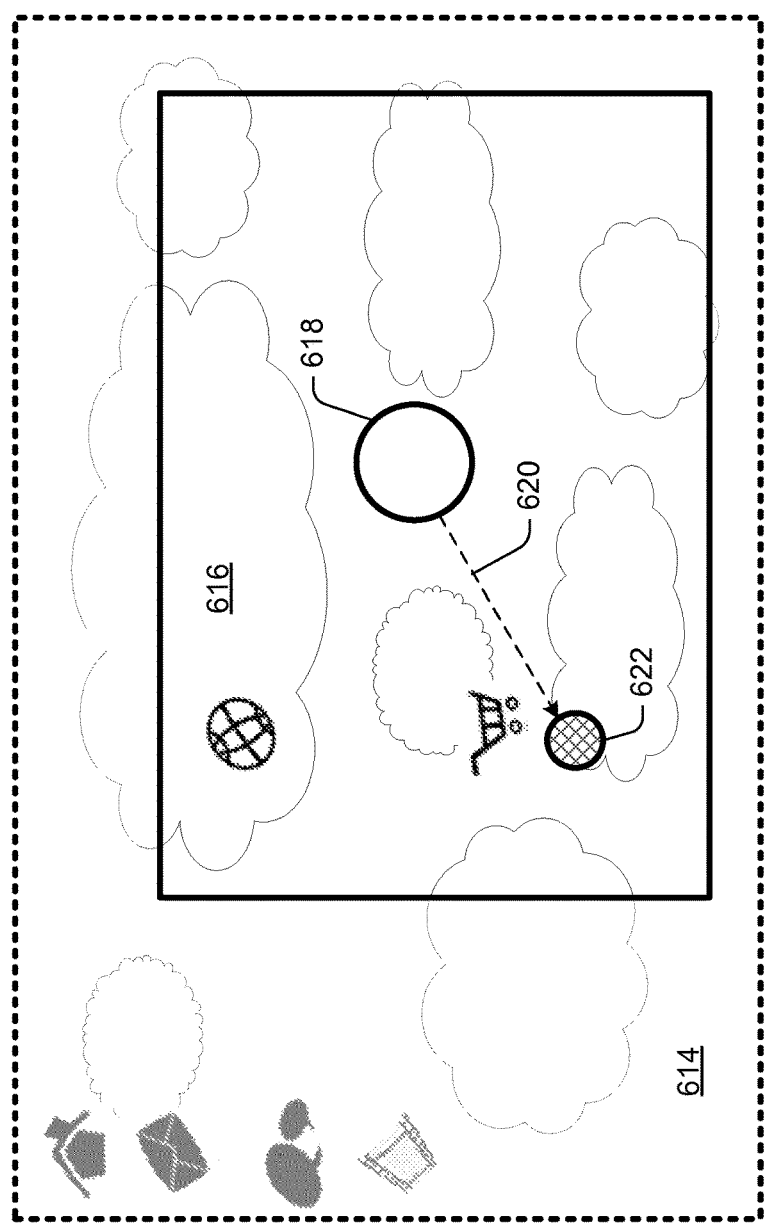
Figure 6:
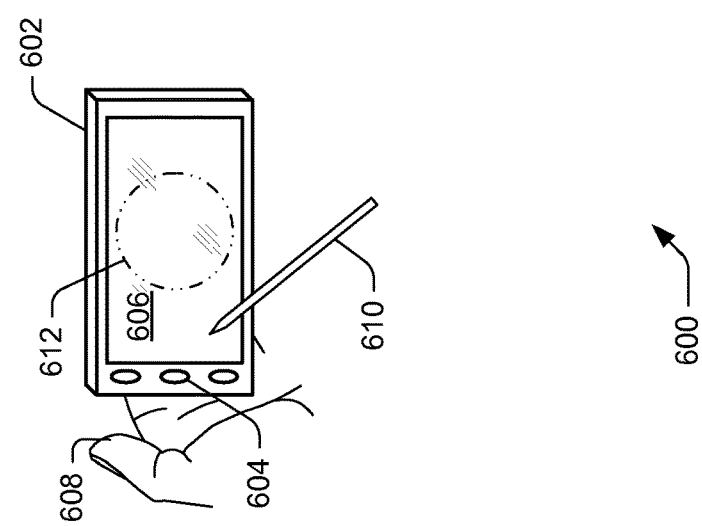
Figure 7:
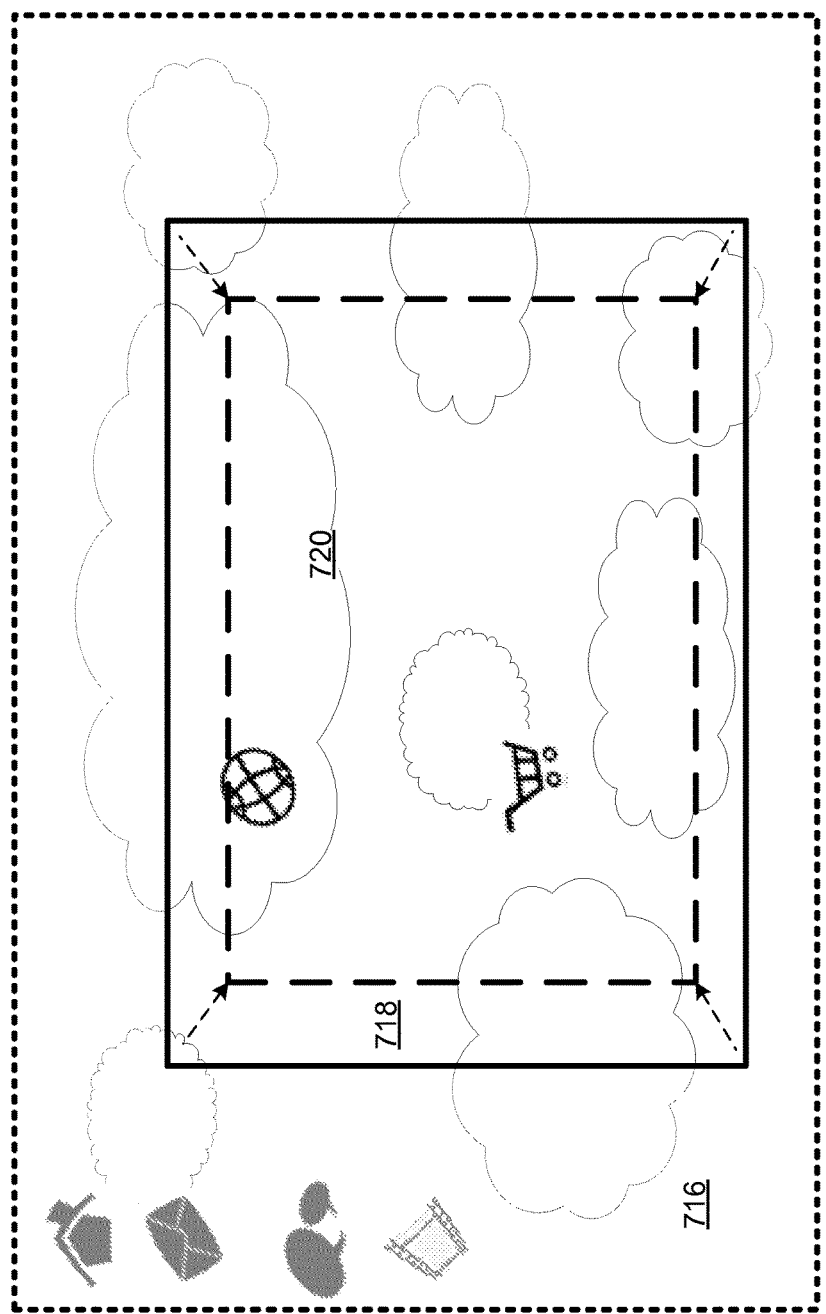

FIGS. 5-7 illustrate aspects of another implementation (called "Joystick") of the described techniques for indirect user interaction with the desktop of a presentation device using the touch-sensitive control surface of a user-input device. Generally speaking, the Joystick user-interaction style utilizes an absolute pointing arrangement for moving a pointer within a pointing region embedded within a relative arrangement for moving the pointing region. The Joystick user-interaction style utilizes stylus strokes on the mobile screen to move a visible circle of addressable pixels around a desktop shown on the external display. This circle looks and behaves like a "joystick" that directs and moves with the pointer.

FIG. 5 shows an exemplary arrangement 500 for the Joystick user-interaction style. This arrangement includes mobile phone 502 with a zoom mode button 504 and a touchscreen 506. As shown, the user's thumb 508 is not pressing the button 504. Therefore, the zoom mode is not activated. The user is using a stylus 510 so that it is touching approximately in the middle of the touchscreen 506. Indeed, the stylus 510 is touching with a dashed-line circular area called a control region 512. While some implementations might display a control region 512 on the touchscreen 506, other implementations might not.

FIG. 5 also shows three nested spaces that are navigated by the user touching the touchscreen 506 of the mobile phone 502. From largest to smallest spaces, the nested spaces include a desktop 514, a displayed viewport 516, and a circular pointing region 518.

A mousing ring 520 is located inside the pointing region 518 in a position that corresponds with the position of the stylus 510 in the control region 512. The ring 520 maps to a point within the pointing region 518 that absolutely corresponds to the point that the user places the stylus 510 inside the control region 512. Likewise, the ring 520 moves within the pointing region 518 in a manner that corresponds absolutely to how the user moves the stylus 510 inside the control region 512. This demonstrates the absolute relationship between mapping and movement of the stylus 510 touching the control region 512 and the ring 520 in the pointing region 518.

FIG. 6 shows another exemplary arrangement 600 for the Joystick user-interaction style. This exemplary arrangement is similar in at least some respects to the arrangement 500. The arrangement 600 includes a mobile phone 602 with a zoom mode button 604 and a touchscreen 606. As shown, the user's thumb 608 is not pressing the button 604. Therefore, the zoom mode is not activated. The user is using a stylus 610 so that it is touching approximately toward the lower left-hand corner of the touchscreen 606. Indeed, the stylus 610 is touching outside of a dashed-line circular area called a control region 612.

FIG. 6 also shows three nested spaces that are navigated by the user touching the touchscreen 606 of the mobile phone 602. From largest to smallest spaces, the nested spaces include a desktop 614, a displayed viewport 616, and a circular pointing region 618.

Touching the touchscreen 606 outside of the control region 612 causes the pointing region to shrink and move in a direction that corresponds to where the touchscreen 606 is touched relative to the control region 612. This is demonstrated in FIG. 6 by the stylus 610 touching the touchscreen 606 below and to the left of the control region 612. This action causes the pointing region to move in a direction that is down and to the left of the original location of the pointing region 618. The direction is shown by dashed-line arrow 620. A pointing-region indicator 622 appears as a smaller version of the original pointing region 618. Once the user stops the motion (by, for example, lifting the stylus 610), the pointing region regains its original size. It also may cause the viewport 616 to move so that the pointing region 618 is re-centered in the viewport 616 again.

FIG. 7 shows still another exemplary arrangement 700 for the Joystick user-interaction style. This arrangement is similar in at least some respects to the arrangement 600. The arrangement 700 includes a mobile phone 702 with a zoom mode button 704 and a touchscreen 706. As shown, the user's thumb 708 is pressing the button 704. Therefore, the zoom mode is activated. Stylus 710, dashed-line stylus 712, and dashed-line arrow 714 depict motion of the stylus 710 while touching the touchscreen 706. Two of the three nested spaces are shown. Those include a desktop 716 and a solid-line displayed viewport 718.

As shown, the user moves the stylus 710 in accordance with dashed-line arrow 714 from a lower left-hand corner toward the middle of the touchscreen 706 to where the dashed-line stylus 712 is shown. When in zoom mode, this motion causes the viewport 718 to zoom in. The opposite movement causes the viewport to zoom out.

A dashed-line viewport 720 along with dashed-line arrows at each corner indicate the zoomed-in result of the zoom-in action. As illustrated, the viewport is shown as decreasing in size. In reality, the viewport stays the same size. Instead, zooming-in causes less of the desktop to be viewed within the same-sized viewport. Of course, when zoomed-out, the same-sized viewport will show more of the desktop. FIG. 7 depicts this change. When zooming, the extent of the desktop 716 that the viewport occupies changes. It will appear that the user is zooming in or zooming out of the desktop. When zooming, the spatial extent of the desktop changes.

In other words, moving the stylus 710 across the touchscreen 706 to the right, away from the depressed button 704, has the effect of "stretching" the desktop 716 and thus zooming the view inwards. The inverse also holds—moving the point of contact across the touchscreen 706 to the left, towards the depressed button 704, has the effect of "pinching" the desktop 716 and thus zooming the view out.

Grabber User Interaction Style

Figure 8:
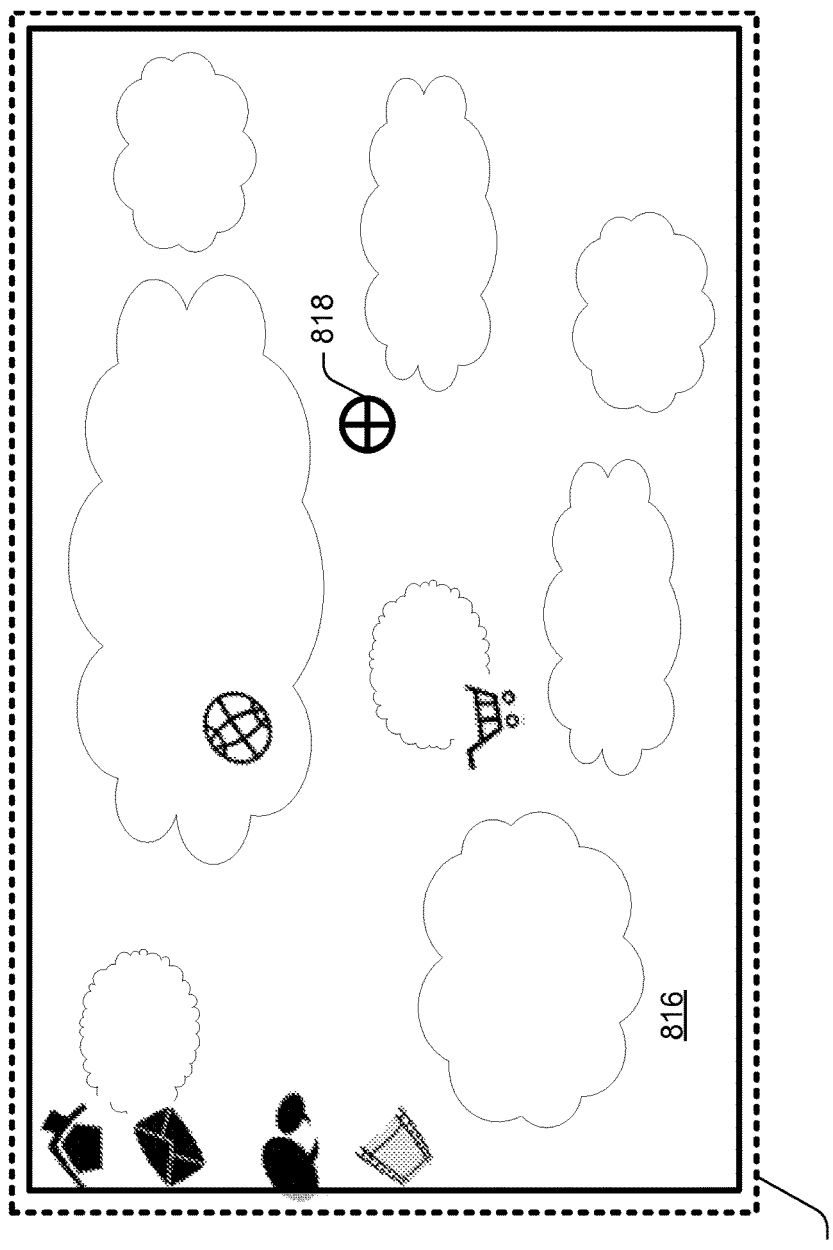
FIGS. 8-9 are exemplary illustrations of still another exemplary user-interaction style (called "Grabber") in accordance with one or more implementations of the techniques described herein.
Figure 8:
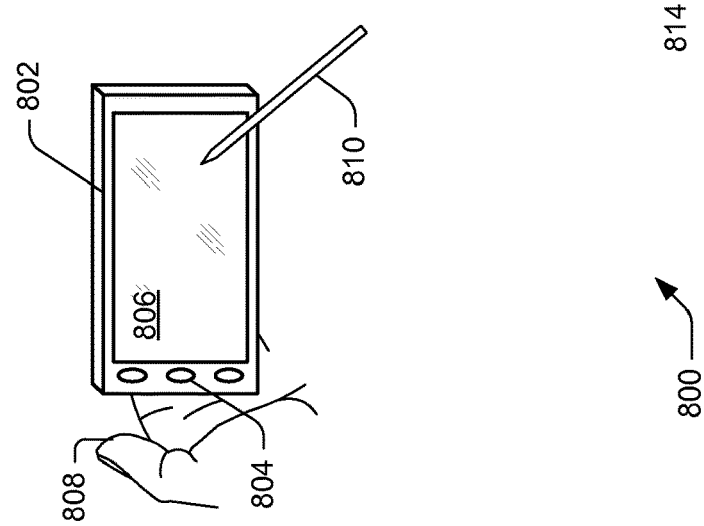
Figure 9:
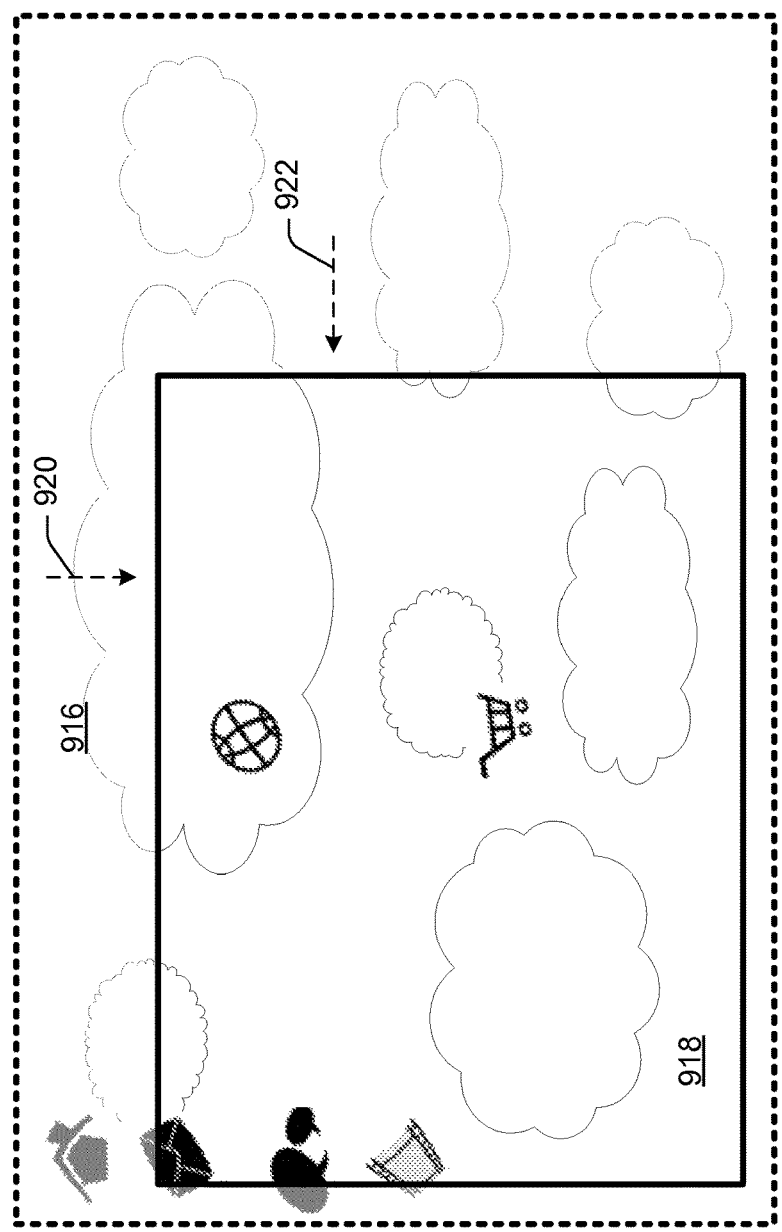
Figure 9:
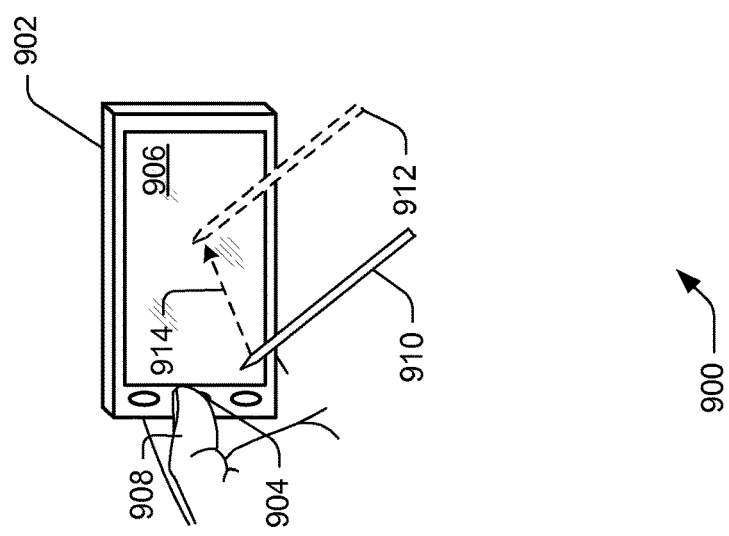

FIGS. 8-9 illustrate aspects of still another implementation (called "Grabber") of the described techniques for indirect user interaction with the desktop of a presentation device using the touch-sensitive control surface of a user-input device. Generally speaking, the Grabber user-interaction style utilizes an absolute pointing arrangement for moving a pointer within a pointing region. That pointing region is embedded within a relative arrangement for zooming a pointing region. Unlike the other user-interaction styles already discussed, with Grabber, the entire touchscreen is mapped to the viewport.

In Grabber user-interaction style, stylus strokes on the mobile screen smoothly zoom into a region of interest from a full desktop overview. This is much like a two-stage operation of a "grabber" arcade machine that challenges fairgoers to successfully locate and "grab" prizes from an underlying tank of objects. Whereas the Joystick technique uses absolute pointing within its pointing region, but relative movement of the pointing region, the Grabber technique uses absolute pointing at all times. The possible pointing area is typically the portion of the desktop visible in the display's viewport—the user zooms in for fine-grained visualization and control of detail, but at the expense of the diminishing visibility of desktop context.

In an alternative Grabber-like implementation where the interaction style is similar in many respects to a Jabber-like implementation, the touchscreen is mapped to the presentation screen during general pointing, but when the user slows down their pointing to a near stop, the size of the pointing box is reduced from the whole presentation screen to a visible pointing box in the vicinity of the cursor (such that the absolute position of the cursor within the pointing box is preserved).

FIG. 8 shows an exemplary arrangement 800 for the Grabber user-interaction style. This arrangement includes mobile phone 802 with a zoom mode button 804 and a touchscreen 806. As shown, the user's thumb 808 is not pressing the button 804. Therefore, the zoom mode is not activated. A stylus 810 is touching the touchscreen 806.

FIG. 8 also shows two nested spaces that are navigated by the user touching the touchscreen 806 of the phone 802. From largest to smallest, the nested spaces include a desktop 814 and a displayed viewport 816. In this implementation, the viewport 816 functions as a pointing region. There is no separate pointing region. For this particular depiction of arrangement 800, the displayed viewport 816 is exactly the same size and shape as the desktop 814. In other words, their spatial extents match.

A mousing ring 818 is located inside the viewport 816 in a position that corresponds with the position of the stylus 810 in the touchscreen 806. For this embodiment, the control region matches the touchscreen 806 completely. As shown in arrangement 800, the ring 818 maps to a point within the viewport 816 that absolutely corresponds to the point that the user places the stylus 810 in the touchscreen 806. Likewise, the ring 818 moves within the viewport 816 in a manner that corresponds absolutely to how the user moves the stylus 810 on the touchscreen 806. This demonstrates the absolute relationship between mapping and movement of the stylus 810 touching the touchscreen 806 and the ring 818 in the viewport 816.

FIG. 9 shows another exemplary arrangement 900 for the Grabber user-interaction style. This arrangement is similar in at least some respects to arrangement 800. The arrangement 900 includes a mobile phone 902 with a zoom mode button 904 and a touchscreen 906. As shown, the user's thumb 908 is pressing the button 904. Therefore, the zoom mode is activated. The user is using a stylus 910 so that it is touching approximately toward the lower left-hand corner of the touchscreen 906. A dashed-line stylus 912 shows the position of the stylus as it has moved from the position shown at 910 in the direction shown by the dashed-line arrow 914.

FIG. 9 also shows two nested spaces that are navigated by the user touching the touchscreen 906 of the mobile phone 902. From largest to smallest, the nested spaces include a desktop 916 and a displayed viewport 918. Like arrangement 800, the viewport 918 functions as the pointing region. There is no separate pointing region.

As shown, the user moves the stylus 910 in accordance with dashed-line arrow 914 from a lower left-hand corner toward the middle of the touchscreen 906 to where the dashed-line stylus 912 is shown. When in zoom mode, this motion causes the viewport 918 to zoom in. The opposite movement causes the viewport 918 to zoom out.

Dashed-line arrows 920 and 922 indicate a change in scale in what the viewport 918 displays. Herein, a change in scale is also called "zooming" in or out. Also, changing the extent of the displayed viewport of the desktop is another term for zooming in/out and scaling. The viewport 918 moved from displaying all of the desktop 916 to only a portion of the desktop, as seen in viewport 918 in FIG. 9. As illustrated, the viewport 918 is shown as decreasing in size. In reality, the viewport 918 stays the same size. Instead, zooming-in causes less of the desktop 916 to be viewed within the same-sized viewport 918. Of course, when zoomed-out, the same-sized viewport 918 will show more of the desktop 916. These drawing depict this change.

Exemplary Process

Figure 10:
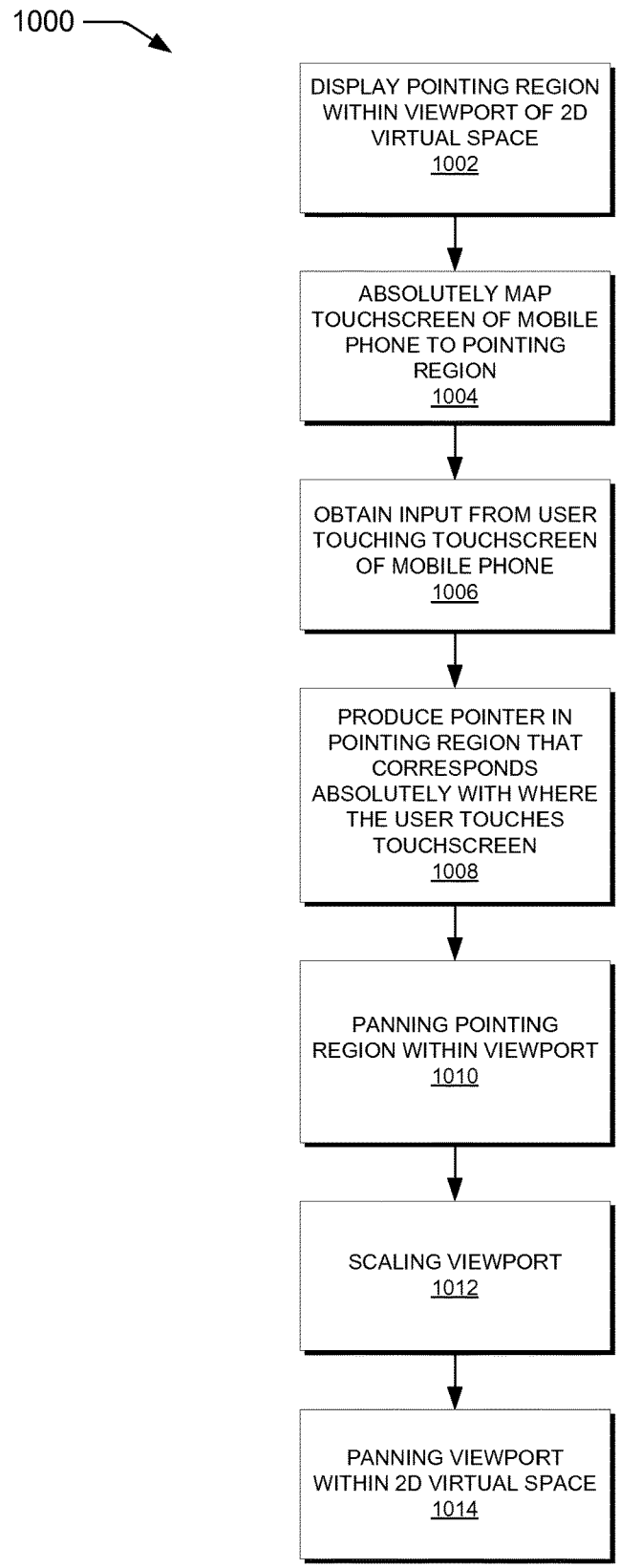
FIG. 10 is flow diagram of at least one exemplary process that implements the techniques described herein.

FIG. 10 is a flow diagram illustrating exemplary process 1000 that implements the techniques described herein for indirect user interaction with the two-dimensional virtual space of a presentation device using the touch-sensitive control surface of a user-input device. The user-interaction styles (e.g., Jabber, Joystick, and Grabber) shown in FIGS. 1-9 and described above are the result of the exemplary process 1000 or some variant of this process.

This process is illustrated as a collection of blocks in a logical flow graph, which represents a sequence of operations that can be implemented in hardware, software, firmware, or a combination thereof. In the context of software, the blocks represent computer instructions stored on one or more computer-readable storage media that, when executed by one or more processors of such a computer, perform the recited operations. Note that the order in which the process is described is not intended to be construed as a limitation, and any number of the described process blocks can be combined in any order to implement the process, or an alternate process. Additionally, individual blocks may be deleted from the process without departing from the spirit and scope of the subject matter described herein.

FIG. 10 illustrates the exemplary process 1000 for indirect user interaction. The process is performed, at least in part, by a presentation device. That presentation device includes one or more computing devices and a visual display unit that are collectively configured to enable a user to interact with a two-dimensional virtual space (i.e., a "desktop") by using the touch-sensitive control surface of a user-input device. The presentation device includes, for example, the visual display unit 104 or some combination of the visual display unit and the computing device 102. The user-input device includes, for example, the mobile phone 106 with its touchscreen 110. The presentation device that is configured, as described herein, qualifies as a particular machine or apparatus.

As shown here, the process 1000 begins with operation 1002, where the presentation device displays a portion of the two-dimensional virtual space ("desktop") on the visual display device. The portion is called the viewport. In addition, a pointing region is displayed within the viewport. The desktop, viewport, and pointing region form a nested relationship. The pointing region is inside the viewport and the viewport is inside the desktop. The spatial extent of the viewport is equal to or less than the spatial extent of the desktop. Likewise, the spatial extent of the pointing region is equal to or less than the spatial extent of the viewport.

In at least one of the implementations described herein, the pointing region having a pointing-region spatial extent no greater than that of the displayed viewport. In alternative implementations, the pointing region spatial extent may be greater than the spatial extent of the displayed viewport.

At operation 1004, the presentation device absolutely maps a control region of the touch-sensitive control surface of the user-input device to the pointing region, which is displayed on the visual display device. In some implementations (e.g., Jabber), the control region and the control surface are the coextensive. In other implementations (e.g., Joystick), the control region is only part of the control surface. Since the mapping is absolute in all implementations, the control region and the pointing region have the same dimensions (i.e., matching spatial extents).

At operation 1006, the presentation device obtains input from the user when the user touches the control surface of the user-input device. For example, input is received from the user touching a stylus to the touchscreen of a mobile phone.

One or more of the implementations described herein offer an indirect user-interaction paradigm. However, with direct user-interaction paradigms, the user touches the screen of the very same visual display unit that is outputting the visual information. This is a common input approach for smart phones. Unlike the direct user-interaction paradigms, with one or more of the implementations described herein, the touch-sensitive control surface of the user-input device is not part of the screen of the very same visual display unit that is outputting the visual information. In other words, the control surface is separate from the presentation device.

At operation 1008, the presentation device, in response to the obtained input, generates and displays a mousing ring (i.e., pointer or cursor) within the absolutely-mapped pointing region of the viewport of the desktop. As can be seen in example instances in FIGS. 1, 2, 5, and 8, the mousing ring (126, 222, 520, and 818, respectively) is produced within the pointing region of the viewport at a point that corresponds absolutely with the point of the user's touch within the control region of the user-input device.

Furthermore, based upon another input, the user can pan the pointing region around the viewport or cause the viewport itself to pan in the desktop or zoom the viewport in or out of the desktop. The additional input may include (by way of example and not limitation): touching specific areas or points on the control surface, pressing buttons on the user-input device, and/or other specific movements or inputs.

At operation 1010, based upon the additional or different input, the presentation device pans the pointing region within the viewport. An example of this action is shown in FIG. 3 and discussions herein regarding that figure.

At operation 1012, based upon the additional or different input, the presentation device scales the viewport within the desktop. Scaling is another term for zooming in or zooming out. Examples of this action are shown in FIGS. 7 and 8 and discussions herein regarding those figures.

At operation 1014, based upon the additional or different input, the presentation device pans the viewport within the desktop. An example of this action is shown in FIG. 4 and discussions herein regarding that figure.

Other Implementation Details

The new implementations described herein assume that the user is looking at the presentation device rather than the touchscreen of the mobile phone. Because of this, some implementations utilize a two-step mousing interface: the user first draws with the stylus and lifts to indicate where the mouse action might occur, then presses in the same place to start a click, drag, or double click. Some implementations utilize a specific feedback mechanism that uses a circle with changing appearance to indicate the various stages of a pointing action (e.g., targeting, stylus lifted to indicate possible mouse action, mouse down, mouse click, mouse drag, mouse double click).

Also, often a user cannot accurately predict the initial point of contact their finger or stylus will make with the mobile screen, nor where that will map to the desktop with one or more of the techniques described herein. That is because users apply the stylus to the mobile screen while viewing a separate (e.g., eyewear or projector) display. A "locating trace" may be used to help users realign the kinesthetic reference frame of the mobile device with the visual reference frame of the displayed view. With a "locating trace," the user prefixes their meaningful interactions with a stroke across the mobile screen. The pointer only appears when the user touches the stylus against the mobile surface and provides dynamic feedback as to the location of stylus contact on the mobile screen. In this way, the two reference frames are brought into alignment and the user can guide the pointer to its target. By adding a locating trace to every mouse operation, the techniques described herein can support a mouse-like pointing style.

Once the user has guided the pointer to a target, button-free "lift and tap" mouse operation of many laptop touchpads may be mimicked. A "stap" is defined as a "subsequent tap" that directly follows a lifting of the stylus away from the touchscreen, and which lands in close spatiotemporal proximity to the last point of contact (e.g., within 15 touchscreen pixels and 0.5 seconds). In the same way, a "strace"—short for "subsequent trace"—is defined as a trace that originates from nearby the last point of contact in space and time. To click on an icon, for example, the user may first perform a "locating trace" to position the pointer on the icon then "stap" to execute the click. Similarly, a locating trace followed by a strace causes a mouse drag along the strace path, which originates from the endpoint of the locating trace, and a locating trace followed by two staps causes a mouse double-click at the end point of the trace.

Concluding Notes

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. Computer-readable storage media may include volatile and nonvolatile, removable and non-removable media implemented in any method or technology for storage of information, such as computer readable instructions, data structures, program modules, or other data. For example, computer-readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; or X employs B; or X employs both A and B, then "X employs A or B" is satisfied under any of the foregoing instances. In addition, the articles "a" and "an", as used in this application and the appended claims, should generally be construed to mean "one or more" unless specified otherwise or clear from context to be directed to a singular form.

Although the subject matter has been described in language specific to structural features and/or methodological acts, the subject matter defined in the appended claims is not necessarily limited to the specific features or acts described. Rather, the specific features and acts are disclosed as exemplary forms of implementing the claims.

We claim:

1. One or more computer-readable media storing processor-executable instructions that cause one or more processors to perform operations that facilitate interaction between a presentation device and a user-input device, the operations comprising:
   causing a display of a viewport of a two-dimensional desktop on the presentation device, wherein the presentation device is associated with a first computing device, and wherein the two-dimensional desktop comprises a virtual space and the viewport displays a portion of the two-dimensional desktop;
   mapping a control region of a touch-sensitive control surface of the user-input device to a pointing region within the viewport, wherein the user-input device is associated with a second computing device, the touch-sensitive control surface of the user-input device being separate from the presentation device, wherein the control region comprises at least a portion of the touch-sensitive control surface, the pointing region having a pointing region spatial extent that is less than a viewport spatial extent of the viewport, the pointing region spatial extent further matching a control region spatial extent of the control region;
   causing a display of a pointing box, at a first location within the viewport, outlining the pointing region;
   causing a display of a mousing ring within the painting box in a first color;
   receiving an indication of a first touch input within the control region of the touch-sensitive control surface of the user-input device;
   in response to the first touch input, causing a display of the mousing ring within the pointing region in a second color, the mousing ring being displayed within the pointing region at a location that corresponds with a location of the first touch input within the control region;
   receiving an indication of a second touch input on a button of the user-input device and a third touch input within the control region of the touch-sensitive control surface of the user-input device;
   in response to the second touch input and the third touch input, generating a second pointing region at a location that corresponds to the third touch input;
   in response to determining that the second pointing region is outside an edge of the viewport, moving the viewport to a second portion of the two-dimensional desktop; and
   upon receiving an indication that the button has been released, updating the display of the viewport on the presentation device and setting the pointing box at the location that corresponds to the third touch input.

2. The one or more computer-readable media as recited in claim 1, wherein a viewport spatial extent of the viewport is less than a desktop spatial extent of the two-dimensional desktop, and the operations further comprises causing a movement of the viewport based at least in part on a determination that the movement of the pointing region extends beyond the viewport and is within the two-dimensional desktop.

3. The one or more computer-readable media as recited in claim 1, wherein the control region is coextensive with the touch-sensitive control surface of the user-input device.

4. The one or more computer-readable media as recited in claim 1, wherein the user-input device includes a wireless, handheld, portable device, and the user-input device being wirelessly coupled to the presentation device.

5. The one or more computer-readable media as recited in claim 1, wherein the first touch input is from a finger or a stylus contacting the touch-sensitive control surface.

6. The one or more computer-readable media as recited in claim 1, wherein the presentation device includes one or more of a head-mounted display, or a wearable display.

7. A method that facilitates user interaction between a presentation device and a user-input device, the method comprising:
   causing a display of a viewport of a two-dimensional desktop on the presentation device, wherein the presentation device is associated with a first computing device, and wherein the two-dimensional desktop comprises a virtual space and the viewport displays at least a portion of the two-dimensional desktop;
   mapping a control region of a touch-sensitive control surface of the user-input device to a pointing region within the viewport, wherein the user-input device is associated with a second computing device, the touch-sensitive control surface of the user-input device being separate from the presentation device, wherein the control region comprises at least a portion of the touch-sensitive control surface, the pointing region having a pointing region spatial extent that is less than a viewport spatial extent of the viewport, the pointing region spatial extent further matching a control region spatial extent of the control region;
   presenting, at a first location within the viewport, a pointing box outlining the pointing region;
   causing a display of a mousing ring within the pointing box in a first color;
   receiving an indication of a first touch input within the control region of the touch-sensitive control surface of the user-input device;
   in response to the first touch input, causing a display of the mousing ring within the pointing region in a second color, the mousing ring the pointer being displayed within the pointing region at a location that corresponds with a location of the first touch input within the control region;
   receiving an indication of a second touch input on a button of the user-input device and a third touch input within the control region of the touch-sensitive control surface of the user-input device; and
   in response to the second touch input and the third touch input, generating a second pointing region at a location that corresponds to the third touch input;
   in response to determining that the second pointing region is outside an edge of the viewport, moving the viewport to a second portion of the two-dimensional desktop; and
   upon receiving an indication that the button has been released, updating the display of the viewport on the presentation device and setting the pointing box at the location that corresponds to the third touch input.

8. The method as recited in claim 7, wherein a viewport spatial extent of the viewport is less than a desktop spatial extent of the two-dimensional desktop.

9. The method as recited in claim 7, wherein the control region coextensive with the touch-sensitive control surface of the user-input device.

10. The method as recited in claim 7, wherein the user-input device includes a wireless, handheld, portable device.

11. The method as recited in claim 7, wherein the first touch input and the third touch input are from a finger or a stylus contacting the touch-sensitive control surface.

12. The method as recited in claim 7, wherein the presentation device includes one or more of a head-mounted display, a wearable display, a pico-projector, or a wall-mounted display.

13. The method as recited in claim 7, wherein the user-input device is wirelessly coupled to the presentation device.

14. The method as recited in claim 7 further comprising:
causing a movement of the viewport based at least in part on a determination that the movement of the pointing region extends beyond the viewport.

15. The method as recited in claim 7 further comprising:
causing a display of a pointing box, within the viewport of the two-dimensional desktop, corresponding to the pointing region.

* * * * *